Feb. 27, 1951 W. E. BAKEWELL 2,543,564
DISCHARGE FOR LIQUIDS FROM A VEHICLE
Filed Aug. 22, 1946 2 Sheets-Sheet 1

Witness
Edward P. Seeley

Inventor
William E. Bakewell
By Harry L. Younger
Attorney

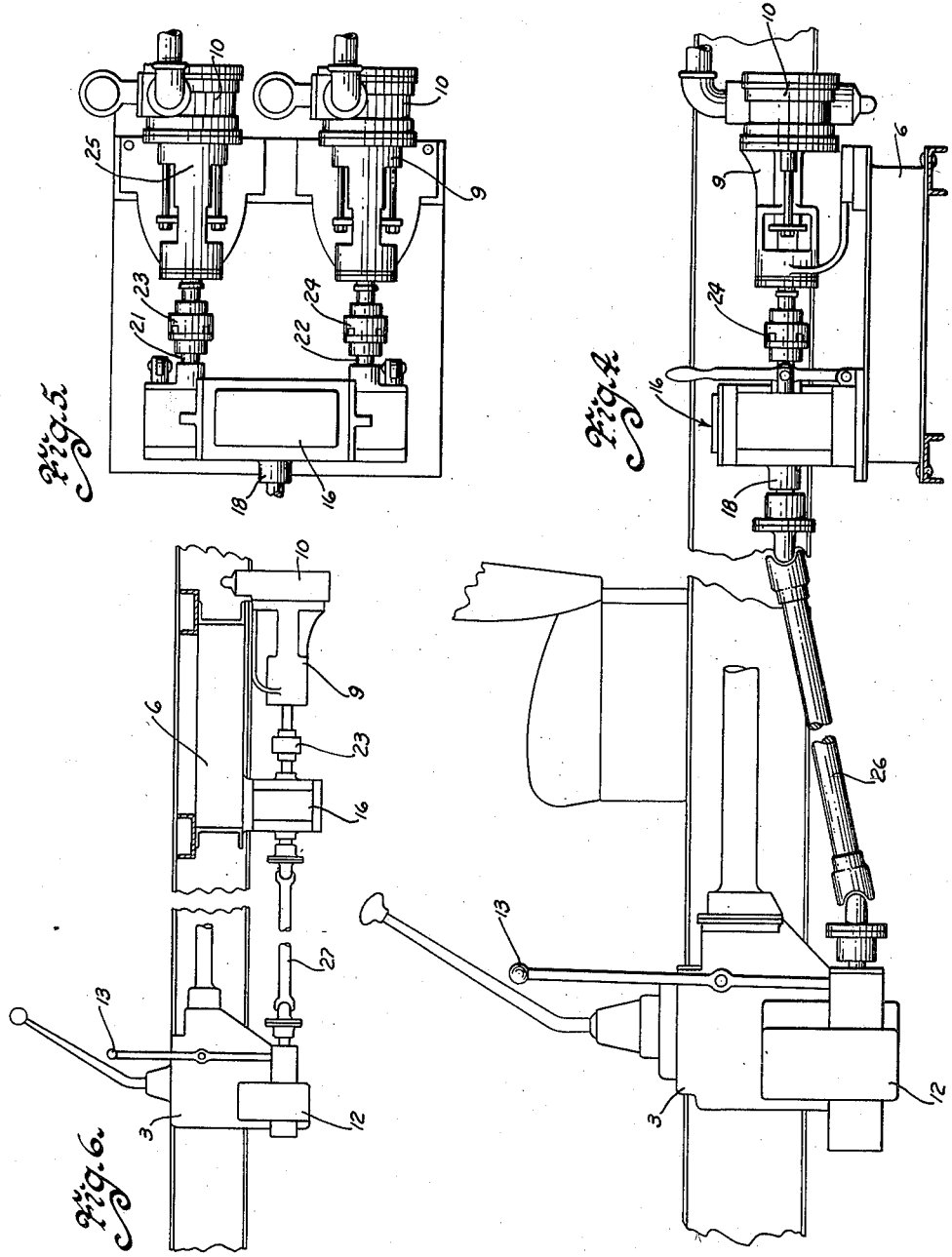

Patented Feb. 27, 1951

2,543,564

UNITED STATES PATENT OFFICE 2,543,564

DISCHARGE FOR LIQUIDS FROM A VEHICLE

William E. Bakewell, Cedar Falls, Iowa

Application August 22, 1946, Serial No. 692,159

2 Claims. (Cl. 103—4)

This invention relates to a means of discharging different liquids from containers on a vehicle and more particularly to a vehicle having compartments containing liquids of different volatility in combination with a discharge arrangement for the compartments wherein possibility of explosions in using the liquids is avoided.

A real problem exists in the delivery of hydrocarbon products where a delivery vehicle has two compartments or chambers and two different hydrocarbons are being delivered from a common outlet hose. For example, if one compartment contained gasoline and the other compartment fuel oil and a delivery of gasoline was made previous to a delivery of fuel oil through a single discharge system, some gasoline would remain in the discharge hose and leave with fuel oil when it is discharged. The gasoline being more volatile than fuel oil would turn to a gas with the resultant danger of explosion when passed through equipment designed to burn a liquid such as fuel oil. In several States, legislation has already been passed prohibiting the delivery of gasoline and fuel oil with a pumping set-up delivering both by means of a common outlet from a vehicle. It is with this problem in mind that the present equipment has been designed.

It is an object of the invention among others to provide a means that will allow delivery of hydrocarbons of different volatility, such as fuel oil and gasoline from a vehicle carrying both without danger of explosion when the hydrocarbon products are used; a means to deliver hydrocarbons of different volatility from a vehicle that meets State requirements effecting the delivery; a means to deliver hydrocarbons of different volatility from a vehicle that is simple and economical in construction and durable and long lasting in operation; a means to deliver hydrocarbons of different volatility from a vehicle that can easily be connected to a vehicle and be actuated by the power source of said vehicle and requiring no great skill on the part of an operator to operate; and a means to deliver hydrocarbons of different volatility from a vehicle that is compact so as to be easily mounted on any vehicle and readily accessible to be put into operation.

In carrying out the objects of the invention there is provided in combination with a vehicle having a frame, an engine, a power transmission means connected with the engine and compartments for transporting liquids mounted on the frame. The improvement resides in adding to this combination a separate pump for each compartment to discharge liquid therefrom and the means of actuating the pumps. A power take-off is connected to the power transmission means from the engine with the said power take-off connected to a second power transmission means which second power transmission means connects independently with either pump. In one instance the pumps are mounted on top of the vehicle frame along with the second power transmission means which is also mounted on top of the vehicle frame. In another modification the pumps are shown attached to the underside of the vehicle frame along with the second power transmission means which is also attached to the underside of the vehicle frame. The power take-off from the transmission means from the engine may be connected to the second transmission means by means of a flexible shaft. The pumps are connected into a housing forming part of the second power transmission means by means of shafts which extend into the housing and means are associated with the second power transmission means to selectively connect either pump into operation. The second power transmission means includes a gear within the housing member with the gear operatively connected with the shaft connecting with the power take-off. Each pump shaft has a gear on the shaft and within the second power transmission member and means are provided to selectively and independently connect the gears on the pump shafts with the gear connecting the shaft from the power take-off to place a pump into operation. The gears on the pump shaft are rotatable therewith and longitudinally movable thereon. There are means, which may be in the form of a rod with a yoke connected thereto and extending over the gear members on the pump shafts, which rods extend outside the second power transmission housing to be actuated from the exterior of the vehicle to independently move the gears longitudinally on the pump shafts into engagement with the gear connected to the shaft running to the power take-off to place a pump into operation. There are means provided between the rod means and housing to lock the gears on the pump shafts in operative or inoperative position.

With the foregoing and other objects in view, the invention will be more fully described hereinafter, and will be particularly pointed out in the claims appended hereto.

In the drawings wherein like symbols refer to like or corresponding parts throughout the several views:

Figure 4 is a side elevational view showing the vehicle transmission connected to the vehicle engine, a power take-off from the vehicle transmission, a shaft connecting the vehicle transmission with the second power transmission, a second power transmission means with separate pump members attached on top the vehicle frame.

Figure 5 is a top plan view of the second power transmission means and pumps.

Figure 6 is a side elevational view, the same as Figure 4, but showing the second power transmission member and pumps attached to the underside of the vehicle frame.

Figure 1:
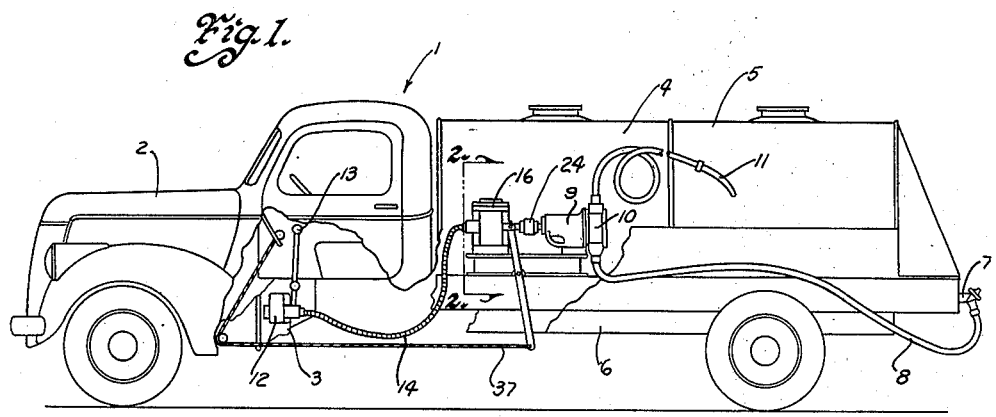
Figure 1 is an elevational view of a vehicle having compartments to deliver hydrocarbons of different volatility with some portions of the vehicle broken away.

Figure 1 shows a vehicle in the form of a truck 1 having an engine under hood 2 which engine is connected to a power transmission means 3. The truck 1 has two compartments or tanks 4 and 5 mounted on vehicle frame 6 to carry hydrocarbon liquids of different volatilities such as gasoline and fuel oil. Each compartment has an outlet such as shown at 7 for tank 5 connected by hose 8 with a pump 9. In unloading a tank or compartment, such as compartment 5, pump 9 is set into operation, forcing liquid through the pump, a meter 10 and delivery hose 11. It is to be understood the same outlet arrangement exists for the compartment 4 but is not shown.

Figure 2:
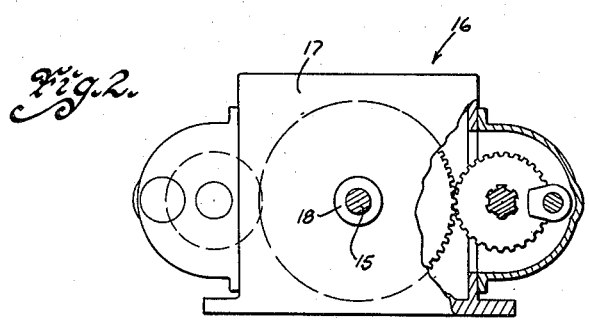
Figure 2 is a sectional view taken through the line 2—2 of Figure 1 showing the second power transmission means in elevation with parts of the second power transmission means broken away.

The power transmission means 3 from the engine of the vehicle has a power take-off 12 associated therewith and a handle 13 to connect power take-off 12 with power transmission means 3 when desired. The power take-off has a shaft 14 connected therewith as in Figure 1, which is a flexible shaft and connects with shaft 15 (Figures 2 and 3) which extends out from second power transmission means 16. The second power transmission means 16 includes a housing 17 having a bearing surface 18 for shaft 15 while the other side of housing 17 receives the other end of shaft 15 in a bearing 19. A gear 20 is mounted on shaft 15 and is rotatable with shaft 15 within the housing 17. Also connected into housing 17 are shafts 21 and 22 which shafts connect by flexible couplings 23 and 24 into pumps 9 and 25. Pumps 9 and 25 may be any suitable pumps and viking rotary pumps have been used most successfully. The pumps 9 and 25 are also attached to the vehicle frame 6 along with the second power transmission means 16. In Figure 1 the second power transmission means 16 and pumps 9 and 25 are shown mounted on top of the vehicle frame 6 on the side of the vehicle beside compartment 4 and just back of the cab of the vehicle. It is noted that the second power transmission means 16 and pumps 9 and 25 could be mounted in the compartment in the rear of truck 1 and the only change necessary would be to lengthen flexible shaft 14.

Figure 4 also shows the second power transmission means 16 and pumps 9 and 25 mounted on top the vehicle frame 6 but with a different type shaft 26 connecting power take-off 12 and the second power transmission means 16. The drive shaft 26 includes two universal joints to allow or provide flexibility in this type assembly.

Figure 6 shows the second power transmission means 16 and pumps 9 and 25 mounted to the underside of vehicle frame 6 in an inverted position. A shaft 27 similar to the shaft 26 of Figure 4 is employed with this modification to transmit power from the power take-off 12 to the second power transmission means 16, however, in this instance it will be noted that shaft 27 is straight through without any bends at the universal joints. This mounting provides slightly more road clearance than the assembly where the second power transmission means 16 and pumps 9 and 25 are mounted on top of frame 6.

Figure 3:
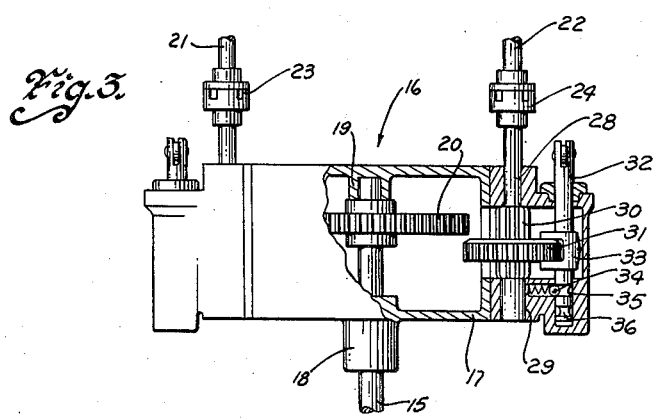
Figure 3 is a top plan view of the second power transmission means with a portion of the top broken away to show the interior of the second power transmission means.

The shafts 21 and 22 extend into housing 17 and are journaled therein in suitable bearings such as 28 and 29 shown for shaft 22 in Figure 3. A portion of shaft 22 within housing 17 is splined as at 30 and the splined portion 30 carries a gear 31. Gear 31 is therefore rotatable with the shaft 22 and is also longitudinally movable on the splined portion 30 into operative position with gear 20 or into inoperative position as shown in Figure 3. A rod 32 has a yoke 33 attached thereon with the yoke 33 fitting over gear 31 and the gear 31 being rotatable within yoke 33. A spring ball means 34 fits into grooves 35 and 36 in the end of rod 32 to hold the rod in operative or inoperative position and prevent inadvertent displacement or movement of gear 31. Rod 32 extends outside housing 17 and is the actuation means to actuate to place gear 31 into operative or inoperative position. It can therefore be seen that the second power transmission means 16 can be actuated from any point exterior thereof.

In operation, it is determined whether pump 9 or 25 is to be operated or in other words which compartment 4 or 5 is to be emptied. Suitable gear 31 is then moved into operative relation with gear 20 and delivery hose 11 is put into place for discharge. Suitable gear 31 may be moved by the operator actuating rod 32 from the side of the truck or chain mechanisms such as illustrated at 37 may extend to the cab of the truck from rods 32 and the proper gear 31 meshed with gear 20 from the cab. After suitable gear 31 and gear 20 are in mesh, the operator actuates handle 13 to put power take-off 12 into mesh with engine transmission means 3. The power from the engine of the vehicle 1 is then transmitted through transmission 3, power take-off 12, flexible shafts 14, 26 or 27 depending upon which species is in use, shaft 15 and gear 20, to gear 31, shaft 22 and thence to pump 9. It can thus be seen that there is a separate pump 9 and 25 and a separate discharge hose 11 for each pump, hence there is never any danger of dispensing gasoline and fuel oil through the same pump and discharge hose which obviates the chance of an explosion when the fuel oil is used.

While the invention has been described in connection with one embodiment, it is to be understood that the words which have been used are words of description rather than of limitation, and that practice of the invention within the scope of the appended claims may be resorted to without departing from the true scope of the invention in all its aspects.

I claim:

1. In a vehicle having a frame, an engine, a power transmission means connected with the engine; and compartments for transporting liquids mounted on the frame, the improvement comprising a separate pump connected into each compartment operable to empty the compartments and a separate discharge line extending from each pump, said pumps mounted side by side and adapted to be mounted on the frame of a vehicle, a power transmission means into which parallel pump shafts from the pumps extend, a shaft extending from the opposite side of the power transmission from which the pump shafts enter the transmission means to connect into a power source, each pump shaft having a gear on the pump shaft within a housing member for the power transmission means which gears are rotatable with the pump shafts and longitudinally movable on the pump shafts, a gear operatively connected to the shaft extending to the power source and said gear being within the housing member, rod means connected to the gears on the pump shafts and extending outside the housing member to independently move either of the gears on the pump shafts longitudinally into engagement with the gear on the shaft extending to the power source from the exterior of the housing member to place one of the pumps into operation and means between the rod means and housing member to lock the gears on the pump shafts in operative or inoperative position.

2. In a vehicle having a frame, an engine, a power transmission means connected with the engine; and compartments for transporting liquids mounted on the frame, the improvement comprising a separable pump connected into each compartment operable to empty the compartments and a separate discharge line extending from each pump, said pumps mounted side by side and adapted to be mounted on the frame of a vehicle, a power transmission means into which parallel pump shafts from the pumps extend, a shaft extending from the opposite side of the power transmission from which the pump shafts enter the transmission means to connect into a power source, each pump shaft having a gear on the pump shaft within a housing member for the power transmission means which gears are rotatable with the pump shafts and longitudinally movable on the pump shafts, a gear operatively connected to the shaft extending to the power source and said gear being within the housing member, rod means connected through a yoke to the gears on the pump shafts with the rods extending outside the housing member to independently move either of the gears on the pump shafts longitudinally into engagement with the gear on the shaft extending to the power source from the exterior of the housing member to place one of the pumps into operation, and means between the rod means and housing member to lock the gears on the pump shafts in operative or inoperative position.

WILLIAM E. BAKEWELL.

REFERENCES CITED

The following references are of record in the file of this patent:

UNITED STATES PATENTS

| Number | Name | Date |
|---|---|---|
| 952,613 | Fairweather et al. | Mar. 22, 1910 |
| 1,023,141 | Eisenbise | Apr. 16, 1912 |
| 1,034,315 | Shepherd | July 30, 1912 |
| 1,321,293 | Drake | Nov. 11, 1919 |
| 1,694,574 | Witter et al. | Dec. 11, 1928 |
| 2,179,171 | Boho | Nov. 7, 1939 |
| 2,308,122 | Clair | Jan. 12, 1943 |